United States Patent
Sun et al.

(10) Patent No.: US 12,452,795 B2
(45) Date of Patent: *Oct. 21, 2025

(54) FULL POWER UPLINK TRANSMISSION ENHANCEMENT

(71) Applicant: Apple Inc., Cupertino, CA (US)

(72) Inventors: Haitong Sun, Cupertino, CA (US); Yushu Zhang, Beijing (CN); Wei Zeng, San Diego, CA (US); Dawei Zhang, Saratoga, CA (US); Ismael Gutierrez Gonzalez, San Jose, CA (US); Ghaith N. Hattab, Santa Clara, CA (US); Yuchul Kim, San Jose, CA (US); Hong He, Cupertino, CA (US); Weidong Yang, San Diego, CA (US); Chunxuan Ye, San Diego, CA (US); Chunhai Yao, Beijing (CN); Oghenekome Oteri, San Diego, CA (US); Yeong-Sun Hwang, Oberhaching (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,965

(22) Filed: Oct. 2, 2023

(65) Prior Publication Data

US 2024/0040513 A1 Feb. 1, 2024

Related U.S. Application Data

(63) Continuation of application No. 18/136,301, filed on Apr. 18, 2023, which is a continuation of application (Continued)

(51) Int. Cl.
*H04W 52/18* (2009.01)
*H04W 72/23* (2023.01)
*H04W 72/51* (2023.01)

(52) U.S. Cl.
CPC .......... *H04W 52/18* (2013.01); *H04W 72/23* (2023.01); *H04W 72/51* (2023.01)

(58) Field of Classification Search
CPC ..... H04W 52/18; H04W 72/23; H04W 72/51; H04W 52/247; H04W 52/281;
(Continued)

(56) References Cited

U.S. PATENT DOCUMENTS

| 11,653,311 | B2 | 5/2023 | Sun et al. |
| 12,232,105 | B2 * | 2/2025 | Huang ................. H04W 52/34 |

(Continued)

FOREIGN PATENT DOCUMENTS

| CN | 110463066 | 11/2019 |
| WO | WO 2019203619 | 10/2019 |
| WO | WO 2020028887 | 2/2020 |

OTHER PUBLICATIONS

InterDigital Inc., "Remaining Issues for Full Power Uplink MIMO Transmission," 3GPP TSG RAN WG1 #99, R1-1912065, Reno, USA, Nov. 18-22, 2019, 6 pages (Year: 2019) (Year: 2019).*

(Continued)

*Primary Examiner* — Rownak Islam
(74) *Attorney, Agent, or Firm* — Fish & Richardson P.C.

(57) ABSTRACT

A method for operating user equipment (UE) includes generating, by the UE, a transmit precoding matrix indicator (TPMI) list including one or more TPMIs selected from a set of available TPMIs stored at a base station (BS). Data indicative of the TPMI list is transmitted to the BS. An index of the TPMI list is transmitted to the BS. Downlink control information (DCI) is received from the BS including an indication of at least one TPMI from the TPMI list based on the index. Uplink data is transmitted to the BS on a physical uplink shared channel (PUSCH) using the at least one TPMI.

20 Claims, 8 Drawing Sheets

Related U.S. Application Data

No. 17/175,494, filed on Feb. 12, 2021, now Pat. No. 11,653,311.

(58) Field of Classification Search
CPC ... H04W 52/325; H04W 52/42; H04W 52/58; H04W 52/146; H04W 72/21; H04W 72/232; H04W 72/1268; H04W 8/24; H04L 5/0023; H04L 5/0051; H04B 7/0478; H04B 7/0628; H04B 7/0639; H04B 7/0456
USPC ............................................................ 370/329
See application file for complete search history.

(56) References Cited

U.S. PATENT DOCUMENTS

| | | | |
|---|---|---|---|
| 2019/0327693 | A1 | 10/2019 | Rahman et al. |
| 2020/0266867 | A1 | 8/2020 | Park et al. |
| 2020/0267661 | A1* | 8/2020 | Park .................... H04W 52/367 |
| 2020/0336998 | A1 | 10/2020 | Rahman et al. |
| 2020/0383062 | A1 | 12/2020 | Wang et al. |
| 2021/0258886 | A1 | 8/2021 | Sun et al. |
| 2022/0124631 | A1 | 4/2022 | Harrison et al. |
| 2022/0140954 | A1 | 5/2022 | Kim et al. |
| 2022/0329310 | A1 | 10/2022 | Pan et al. |
| 2022/0352934 | A1 | 11/2022 | Shi et al. |
| 2023/0337145 | A1 | 10/2023 | Sun et al. |

OTHER PUBLICATIONS

3GPP TS 38.211, "3rd Generation Partnership Project; Technical Specification Group Radio Access Network; NR; Physical channels and modulation (Release 16)," V16.0.0, Dec. 2019, 129 pages.

3GPP TS 38.212, "3rd Generation Partnership Project; Technical Specification Group Radio Access Network; NR; Multiplexing and channel coding (Release 16)," V16.0.0, Dec. 2019, 145 pages.

3GPP TS 38.306, "3rd Generation Partnership Project; Technical Specification Group Radio Access Network; NR; User Equipment (UE) radio access capabilities (Release 15)," 3GPP TS 38.306 V15.8.0, Dec. 2019, 54 pages.

Ericsson, "Power control for UL MIMO," 3GPP TSG RAN WG1 Meeting #92bis, Sanya, China, R1-1805205, Apr. 16-20, 2018, 8 pages.

International Search Report and Written Opinion in International Appln. No. PCT/CN2020/074943, dated Nov. 17, 2020, 9 pages.

Media Tek Inc. "Full Tx power UL transmission," 3GPP TSG RAN WG, #98bis, R1-1911048, Chongqing, China, Oct. 14-20, 2019, Section 2.2.2 "SRS Resource Configuration in RRC," 8 pages.

Media Tek Inc., "Full Tx power UL transmission," 3GPP TSG RAN WG1, #98bis, R1-1911048, Chongqing, China, Oct. 14-20, 2019, Proposal 5, 8 pages.

NTT Docomo, Inc. "Full Tx Power UL Transmission," 3GPP TSG RAN WG1 #98bis, Chongqing, China, Oct. 14-20, 2019, R1-1911186, 14 pages.

NTT Docomo, Inc. "Full Tx Power UL transmission," 3GPP TSG RAN WG1 #99, R1-1912895, Reno, USA, Nov. 18-22, 2019, 23 pages.

Samsung, "View of full power UL transmission," 3GPP TSG RAN WG1 Meeting #99, R1-1912484, Reno, USA, Nov. 18-22, 2019, 6 pages.

Vivo, "Feature lead summary on Full TX Power UL transmission," 3GPP TSG RAN WG1 #99, R1-1912042, Reno, USA, Nov. 18-22, 2019, 30 pages.

Vivo, "Remaining issues on UL full power Tx," 3GPP TSG RAN WG1 #99, R1-1912041, Reno, USA, Nov. 18-22, 2019, 4 pages.

Qualcomm Incorporated, "Full Tx power for UL transmissions," 3GPP TSG RAN WG1 #98bis, R1-1911128, Chongqing, China, Oct. 14-20, 2019, 14 pages.

Qualcomm Incorporated, "Full Tx power for UL transmissions," 3GPP TSG RAN WG1 #99, R1-1912969, Reno, Nevada, USA, Nov. 18-22, 2019, 13 pages.

ZTE, "Full TX Power UL transmission," 3GPP TSG RAN WG1 Meeting #99, R1- 1911932, Reno, Nevada, USA, Nov. 18-22, 2019, 8 pages.

[No Author Listed], "3rd Generation Partnership Project; Technical Specification Group Radio Access Network; NR; Physical Layer procedures for data," 3GPP TS 38.214 V16.0.0, Section 6.1.1.1, Dec. 2019, 3 pages.

Samsung, "Enhancements on MIMO for NR," 3GPP TSG RAN Meeting #86, RP-193194, Sitges, Spain, Dec. 9-12, 2019, 29 pages.

* cited by examiner

FULL POWER UPLINK TRANSMISSION ENHANCEMENT

CROSS-REFERENCE TO RELATED APPLICATION

This application is a continuation of U.S. application Ser. No. 18/136,301, filed Apr. 18, 2023, which is a continuation of U.S. application Ser. No. 17/175,494, filed Feb. 12, 2021, which claims priority to International Application No. PCT/CN2020/074943, filed Feb. 12, 2020, the entire contents of which are incorporated herein by reference.

TECHNICAL FIELD

This disclosure relates generally to techniques for enhanced full power uplink transmission in wireless communication networks, such as cellular networks.

BACKGROUND

Wireless communication systems are rapidly growing in usage. Further, wireless communication technology has evolved from voice-only communications to also include the transmission of data, such as Internet and multimedia content. The quality of communications and data transmissions depends in part on the ability of the system to transmit signals at an optimal power level.

SUMMARY

In general, in an aspect, a method for operating user equipment (UE) includes generating, by the UE, a transmit precoding matrix indicator (TPMI) list including one or more TPMIs selected from a set of available TPMIs stored at a base station (BS). Data indicative of the TPMI list is transmitted to the BS. An index of the TPMI list is transmitted to the BS. Downlink control information (DCI) is received from the BS including an indication of at least one TPMI from the TPMI list based on the index. Uplink data is transmitted to the BS on a physical uplink shared channel (PUSCH) using the at least one TPMI.

In general, in an aspect, a UE includes one or more processors, and memory storing instructions that, when executed by the one or more processors, cause the one or more processors to perform operations including: generating, by the UE, a TPMI list including one or more TPMIs selected from a set of available TPMIs stored at a BS; transmitting, to the BS, data indicative of the TPMI list; transmitting, to the BS, an index of the TPMI list; receiving, from the BS, DCI including an indication of at least one TPMI from the TPMI list based on the index; and transmitting, to the BS, uplink data using a PUSCH using the at least one TPMI.

In general, in an aspect, a non-transitory computer-readable medium stores instructions that, when executed by one or more processors, cause the one or more processors to perform operations including: generating, by the UE, a TPMI list including one or more TPMIs selected from a set of available TPMIs stored at a BS; transmitting, to the BS, data indicative of the TPMI list; transmitting, to the BS, an index of the TPMI list; receiving, from the BS, DCI including an indication of at least one TPMI from the TPMI list based on the index; and transmitting, to the BS, uplink data using a PUSCH using the at least one TPMI.

Implementations of any of the above aspects can include one or a combination of two or more of the following features.

The one or more TPMIs in the TPMI list can support full power transmission by the UE. In some implementations, the TPMI list includes a bitmap indicative of the one or more TPMIs. In some implementations, the one or more TPMIs are arbitrarily selected from the set of available TPMIs at the BS. The set of available TPMIs can include, but are not limited to, those TPMIs described here and included in 3GPP TS 38.211. In some implementations, the index of the TPMI list is transmitted to the BS per frequency band per frequency band combination. The TPMI list can be stored as a TPMI group for the UE at the BS, and the index can be an index of the TPMI group. In some implementations, the TPMI list is transmitted to the BS as part of the capability information reported by the UE. In some implementations, the UE alters the TPMI list to produce a second TPMI list including at least one TPMI from the set of available TPMIs that is different from the one or more TPMIs of the TPMI list, and data indicative of the second TPMI list is transmitted to the BS. In some implementations, the uplink data is transmitted at full power by the UE using the at least one TPMI.

In general, in an aspect, a method for operating a BS, includes: receiving, from a UE, data indicative of a TPMI list generated by the UE, the TPMI list including one or more TPMIs selected from a set of available TPMIs stored at the BS; receiving, from the UE, an index of the TPMI list; transmitting, to the UE, DCI including an indication of at least one TPMI from the TPMI list based on the index; and receiving, from the UE, uplink data from a PUSCH based on the at least one TPMI.

In general, in an aspect, a BS includes one or more processors and memory storing instructions that, when executed by the one or more processors, cause the one or more processors to perform operations including: receiving, from a UE, data indicative of a TPMI list generated by the UE, the TPMI list including one or more TPMIs selected from a set of available TPMIs stored at the BS; receiving, from the UE, an index of the TPMI list; transmitting, to the UE, DCI including an indication of at least one TPMI from the TPMI list based on the index; and receiving, from the UE, uplink data from a PUSCH based on the at least one TPMI.

In general, in an aspect, a non-transitory computer-readable medium stores instructions that, when executed by one or more processors, cause the one or more processors to perform operations including: receiving, from a UE, data indicative of a TPMI list generated by the UE, the TPMI list including one or more TPMIs selected from a set of available TPMIs stored at the BS; receiving, from the UE, an index of the TPMI list; transmitting, to the UE, DCI including an indication of at least one TPMI from the TPMI list based on the index; and receiving, from the UE, uplink data from a PUSCH based on the at least one TPMI.

Implementations of any of the above aspects can include one or a combination of two or more of the following features.

The index of the TPMI list can be received from the UE per frequency band per frequency band combination. The TPMI list can be received in one or more capability reporting messages from the UE. The TPMI list can be stored as a TPMI group for the UE at the BS, and the index can include an index of the TPMI group. The TPMI list can include a bitmap indicative of the one or more TPMIs. The one or more TPMIs in the TPMI list can support full power transmission by the UE. In some implementations, the TMPI list generated by the UE is stored at the BS, and the index of the TPMI list is received from the UE per frequency band per frequency band combination to indicate the at least one TPMI from the TPMI list supporting full power transmission. In some implementations, a second TPMI list is received from the UE including at least one TPMI from the set of available TPMIs that is different from the one or more TPMIs of the TPMI list, the DCI including an indication of the at least one TPMI from the second TPMI list is transmitted to the UE.

In general, in an aspect, a method for operating a UE includes: transmitting, to a BS, capability information for the UE, the capability information including an indication that the UE is capable of operating in a full power uplink transmission mode without reporting a TPMI group for full power transmission; receiving, from the BS, a radio resource control (RRC) message for configuring the UE for full power uplink transmission, where the RRC message is determined based on the indication that the UE is capable of operating in the full power uplink transmission mode without reporting the TPMI group for full power transmission and transmitting, to the BS, uplink data using a PUSCH based on the RRC message.

In general, in an aspect, a UE includes one or more processors and memory storing instructions that, when executed by the one or more processors, cause the one or more processors to perform operations including: transmitting, to a BS, capability information for the UE, the capability information including an indication that the UE is capable of operating in a full power uplink transmission mode without reporting a TPMI group for full power transmission; receiving, from the BS, a RRC message for configuring the UE for full power uplink transmission, where the RRC message is determined based on the indication that the UE is capable of operating in the full power uplink transmission mode without reporting the TPMI group for full power transmission and transmitting, to the BS, uplink data using a PUSCH based on the RRC message.

In general, in an aspect, a non-transitory computer-readable medium stores instructions that, when executed by one or more processors, cause the one or more processors to perform operations including: transmitting, to a BS, capability information for the UE, the capability information including an indication that the UE is capable of operating in a full power uplink transmission mode without reporting a TPMI group for full power transmission; receiving, from the BS, a RRC message for configuring the UE for full power uplink transmission, where the RRC message is determined based on the indication that the UE is capable of operating in the full power uplink transmission mode without reporting the TPMI group for full power transmission and transmitting, to the BS, uplink data using a PUSCH based on the RRC message.

Implementations of any of the above aspects can include one or a combination of two or more of the following features.

The RRC message can include information for allocation of a sounding reference signal (SRS) resource based on the indication that the UE is capable of operating in the full power uplink transmission mode without reporting the TPMI group for full power transmission. For example, the SRS resource can include a 1-port SRS to support rank one full power uplink transmission with antenna virtualization by the UE or a 2-port SRS to support rank two full power uplink transmission with antenna virtualization by the UE, or both. In some implementations, the RRC message includes indication of a TPMI for rank three full power transmission by the UE. In some implementations, the indication that the UE is capable of operating in the full power uplink transmission mode without reporting the TPMI group for full power transmission includes an indication that no additional SRS resources are needed by the UE. In some implementations, the full power uplink transmission mode includes a mode two full power uplink transmission mode. In some implementations, the TPMI group is generated by the UE in accordance with the techniques described here.

In general, in an aspect, a method for operating a BS includes: receiving, from a UE, capability information for the UE, the capability information including an indication that the UE is capable of operating in a full power uplink transmission mode without reporting a TPMI group for full power transmission; generating a RRC message for configuring the UE for full power uplink transmission based on the indication that the UE is capable of operating in the full power uplink transmission mode without reporting the TPMI group for full power transmission; transmitting, to the UE, the RRC message; and receiving, from the UE, uplink data from a PUSCH based on the RRC message.

In general, in an aspect, a BS includes one or more processors and memory storing instructions that, when executed by the one or more processors, cause the one or more processors to perform operations including: receiving, from a UE, capability information for the UE, the capability information including an indication that the UE is capable of operating in a full power uplink transmission mode without reporting a TPMI group for full power transmission; generating a RRC message for configuring the UE for full power uplink transmission based on the indication that the UE is capable of operating in the full power uplink transmission mode without reporting the TPMI group for full power transmission; transmitting, to the UE, the RRC message; and receiving, from the UE, uplink data from a PUSCH based on the RRC message.

In general, in an aspect, a non-transitory computer-readable medium stores instructions that, when executed by one or more processors, cause the one or more processors to perform operations including: receiving, from a UE, capability information for the UE, the capability information including an indication that the UE is capable of operating in a full power uplink transmission mode without reporting a TPMI group for full power transmission; generating a RRC message for configuring the UE for full power uplink transmission based on the indication that the UE is capable of operating in the full power uplink transmission mode without reporting the TPMI group for full power transmission; transmitting, to the UE, the RRC message; and receiving, from the UE, uplink data from a PUSCH based on the RRC message.

Implementations of any of the above aspects can include one or a combination of two or more of the following features.

The RRC message can include information for allocation of a sounding reference signal (SRS) resource based on the indication that the UE is capable of operating in the full power uplink transmission mode without reporting the TPMI group for full power transmission. For example, the SRS resource can include a 1-port SRS to support rank one full power uplink transmission with antenna virtualization by the UE or a 2-port SRS to support rank two full power uplink transmission with antenna virtualization by the UE, or both. In some implementations, the RRC message includes indication of a TPMI for rank three full power transmission by the UE. In some implementations, the indication that the UE is capable of operating in the full power uplink transmission mode without reporting the TPMI group for full power transmission includes an indication that no additional SRS resources are needed by the UE. In some implementations, the full power uplink transmission mode includes a mode two full power uplink transmission mode. In some implementations, the TPMI group is generated by the UE in accordance with the techniques described here.

In general, in an aspect, a method for operating a UE includes: transmitting, to a BS, capability information for the UE, the capability information including an indication that the UE is capable of operating in a full power uplink transmission mode and a bitmap indicating one or more TPMIs for full power transmission; receiving, from the BS, a RRC message for configuring the UE for full power uplink transmission, where the RRC message is determined based on the indication that the UE is capable of operating in the full power uplink transmission mode and the bitmap indicating one or more TPMIs for full power transmission; and transmitting, to the BS, uplink data using a PUSCH based on the RRC message.

In general, in an aspect, a UE includes one or more processors and memory storing instructions that, when executed by the one or more processors, cause the one or more processors to perform operations including: transmitting, to a BS, capability information for the UE, the capability information including an indication that the UE is capable of operating in a full power uplink transmission mode and a bitmap indicating one or more TPMIs for full power transmission; receiving, from the BS, a RRC message for configuring the UE for full power uplink transmission, where the RRC message is determined based on the indication that the UE is capable of operating in the full power uplink transmission mode and the bitmap indicating one or more TPMIs for full power transmission; and transmitting, to the BS, uplink data using a PUSCH based on the RRC message.

In general, in an aspect, a non-transitory computer-readable medium stores instructions that, when executed by one or more processors, cause the one or more processors to perform operations including: transmitting, to a BS, capability information for the UE, the capability information including an indication that the UE is capable of operating in a full power uplink transmission mode and a bitmap indicating one or more TPMIs for full power transmission; receiving, from the BS, a RRC message for configuring the UE for full power uplink transmission, where the RRC message is determined based on the indication that the UE is capable of operating in the full power uplink transmission mode and the bitmap indicating one or more TPMIs for full power transmission; and transmitting, to the BS, uplink data using a PUSCH based on the RRC message.

Implementations of any of the above aspects can include one or a combination of two or more of the following features.

The UE can include two ports, and the bitmap can be (1, 1). The RRC message can include, for example, information for allocation of a SRS resource including a 1-port SRS to support rank one full power uplink transmission with antenna virtualization by the UE, an indication that no additional SRS resources are needed by the UE, or an indication that UE requires power amplifier (PA) to physical layer (PHY) antenna switching or additional switching delay between TPMI, or both. In some implementations, the UE includes two ports, and the bitmap is (0, 0). The RRC message can include, for example, information for allocation of a SRS resource including a 1-port SRS to support rank one full power uplink transmission with antenna virtualization by the UE. The full power uplink transmission mode can include a mode two full power uplink transmission mode.

In general, in an aspect, a method for operating a BS includes: receiving, from a UE, capability information for the UE, the capability information including an indication that the UE is capable of operating in a full power uplink transmission mode and a bitmap indicating one or more TPMIs for full power transmission; generating a RRC message for configuring the UE for full power uplink transmission based on the indication that the UE is capable of operating in the full power uplink transmission mode and the bitmap indicating one or more TPMIs for full power transmission; transmitting, to the UE, the RRC message; and receiving, from the UE, uplink data from a PUSCH based on the RRC message.

In general, in an aspect, a BS includes one or more processors and memory storing instructions that, when executed by the one or more processors, cause the one or more processors to perform operations including: receiving, from a UE, capability information for the UE, the capability information including an indication that the UE is capable of operating in a full power uplink transmission mode and a bitmap indicating one or more TPMIs for full power transmission; generating a RRC message for configuring the UE for full power uplink transmission based on the indication that the UE is capable of operating in the full power uplink transmission mode and the bitmap indicating one or more TPMIs for full power transmission; transmitting, to the UE, the RRC message; and receiving, from the UE, uplink data from a PUSCH based on the RRC message.

In general, in an aspect, a non-transitory computer-readable medium stores instructions that, when executed by one or more processors, cause the one or more processors to perform operations including: receiving, from a UE, capability information for the UE, the capability information including an indication that the UE is capable of operating in a full power uplink transmission mode and a bitmap indicating one or more TPMIs for full power transmission; generating a RRC message for configuring the UE for full power uplink transmission based on the indication that the UE is capable of operating in the full power uplink transmission mode and the bitmap indicating one or more TPMIs for full power transmission; transmitting, to the UE, the RRC message; and receiving, from the UE, uplink data from a PUSCH based on the RRC message.

Implementations of any of the above aspects can include one or a combination of two or more of the following features.

The UE can include two ports, and the bitmap can be (1, 1). The BS can allocate, by the RRC message, a SRS resource including a 1-port SRS to support rank one full power uplink transmission with antenna virtualization by the UE, an indication that no additional SRS resources are needed by the UE, or an indication that UE requires power amplifier (PA) to physical layer (PHY) antenna switching or additional switching delay between TPMI, or both. In some implementations, the UE includes two ports, and the bitmap is (0, 0). The BS can allocate, by the RRC message, a SRS resource including a 1-port SRS to support rank one full power uplink transmission with antenna virtualization by the UE. The full power uplink transmission mode can include a mode two full power uplink transmission mode.

In general, in an aspect, a method for operating a UE includes: transmitting, to a BS, capability information for the UE, the capability information including a first capability for a first number of ports and a second capability for a second number of ports, the second number of ports being less than the first number of ports; receiving, from the BS, a RRC message for configuring the UE for full power uplink transmission, where the RRC message includes at least one SRS resource including the second number of ports; and transmitting, to the BS, uplink data using a PUSCH based on the RRC message.

In general, in an aspect, a UE includes one or more processors and memory storing instructions that, when executed by the one or more processors, cause the one or more processors to perform operations including: transmitting, to a BS, capability information for the UE, the capability information including a first capability for a first number of ports and a second capability for a second number of ports, the second number of ports being less than the first number of ports; receiving, from the BS, a RRC message for configuring the UE for full power uplink transmission, where the RRC message includes at least one SRS resource including the second number of ports; and transmitting, to the BS, uplink data using a PUSCH based on the RRC message.

In general, in an aspect, a non-transitory computer-readable medium stores instructions that, when executed by one or more processors, cause the one or more processors to perform operations including: transmitting, to a BS, capability information for the UE, the capability information including a first capability for a first number of ports and a second capability for a second number of ports, the second number of ports being less than the first number of ports; receiving, from the BS, a RRC message for configuring the UE for full power uplink transmission, where the RRC message includes at least one SRS resource including the second number of ports; and transmitting, to the BS, uplink data using a PUSCH based on the RRC message.

Implementations of any of the above aspects can include one or a combination of two or more of the following features.

The first capability can include an indication of one or more TPMIs for full power transmission using the first number of ports, and the second capability can include an indication of one or more TPMIs for full power transmission using the second number of ports. In some implementations, the first or second capabilities, or both, include an indication of a respective TPMI group for the first or second number of ports (or both), which may be a UE-generated group as described herein. In some implementations, the SRS resource is mapped to a TPMI group indicated by the UE. The RRC message can configure the UE for full power uplink transmission based on the second capability. In some implementations, the RRC message includes a second SRS resource with the first number of ports. The uplink data can be transmitted at full power by the UE based on the RRC message.

In general, in an aspect, a method for operating a BS includes: receiving, from a UE, capability information for the UE, the capability information including a first capability for a first number of ports and a second capability for a second number of ports, the second number of ports being less than the first number of ports; transmitting, to the UE, a RRC message for configuring the UE for full power uplink transmission, where the RRC message includes at least one SRS resource including the second number of ports; and receiving, from the UE, uplink data using a PUSCH based on the RRC message.

In general, in an aspect, a BS includes one or more processors and memory storing instructions that, when executed by the one or more processors, cause the one or more processors to perform operations including: receiving, from a UE, capability information for the UE, the capability information including a first capability for a first number of ports and a second capability for a second number of ports, the second number of ports being less than the first number of ports; transmitting, to the UE, a RRC message for configuring the UE for full power uplink transmission, where the RRC message includes at least one SRS resource including the second number of ports; and receiving, from the UE, uplink data using a PUSCH based on the RRC message.

In general, in an aspect, a non-transitory computer-readable medium stores instructions that, when executed by one or more processors, cause the one or more processors to perform operations including: receiving, from a UE, capability information for the UE, the capability information including a first capability for a first number of ports and a second capability for a second number of ports, the second number of ports being less than the first number of ports; transmitting, to the UE, a RRC message for configuring the UE for full power uplink transmission, where the RRC message includes at least one SRS resource including the second number of ports; and receiving, from the UE, uplink data using a PUSCH based on the RRC message.

Implementations of any of the above aspects can include one or a combination of two or more of the following features.

The first capability can include an indication of one or more TPMIs for full power transmission using the first number of ports, and the second capability can include an indication of one or more TPMIs for full power transmission using the second number of ports. In some implementations, the first or second capabilities, or both, include an indication of a respective TPMI group for the first or second number of ports (or both), which may be a UE-generated group as described herein. In some implementations, the SRS resource is mapped to a TPMI group indicated by the UE. The BS can configure the UE, by the RRC message, for full power uplink transmission based on the second capability. In some implementations, the RRC message includes a second SRS resource with the first number of ports. The uplink data can be received at full power by the UE based on the RRC message.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

The techniques described here provide for enhanced uplink (UL) full power transmission relative to, for example, Mode 2 UL transmission under the 5G new radio (NR) standards. For instance, in some implementations, the techniques described here can allow user equipment (UE) to define arbitrary transmit precoder matrix indicator (TPMI) groups in addition to or in place of those defined under the 5G NR standards. The UE-defined TPMI groups can be provided to a base station (BS) and indicated on a per frequency band per frequency band combination basis for use in UL transmissions. In some implementations, additional hardcoded TPMI groups can be defined, for example, for partial-coherent UEs.

In some implementations, UL full power transmission can be improved by deriving implied directives from capability information reported by a UE. For example, the techniques described here can allow a UE to imply a sounding reference signal (SRS) configuration, such as a number of SRS ports or a TPMI group for a port, or both, through an implied directive compatible with the existing capability reporting framework. Other features for improving UL full power transmission are also described.

Figure 1:
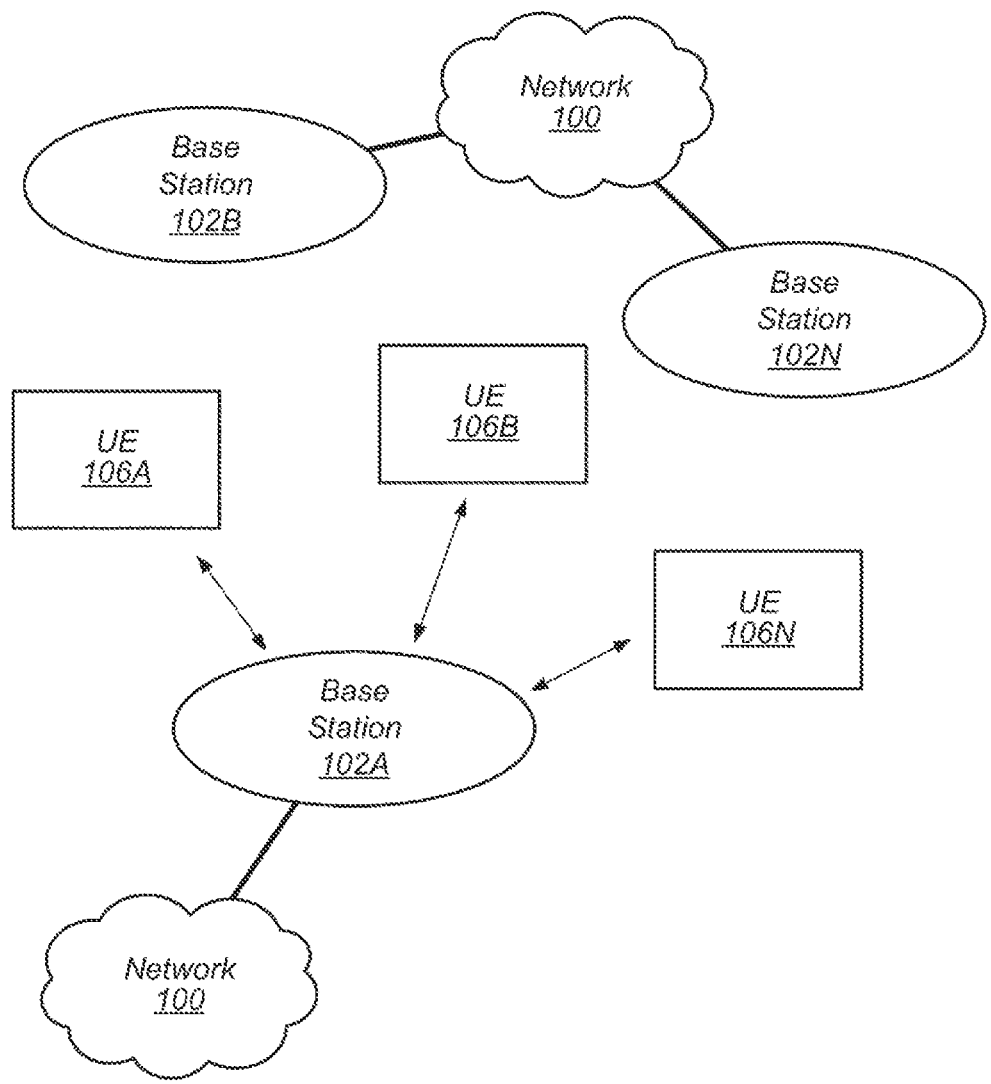
FIG. 1 illustrates an example wireless communication system.

FIG. 1 illustrates an example wireless communication system 100. It is noted that the system of FIG. 1 is merely one example of a possible system, and that features of this disclosure may be implemented in any of various systems, as desired.

The system 100 includes a base station 102A which communicates over a transmission medium with one or more user devices 106A, 106B, . . . , 106N. Each of the user devices may be referred to herein as a "user equipment" (UE). Thus, the user devices 106 are referred to as UEs or UE devices. In some implementations, the UEs may be reduced capability or "light" UEs.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, or 3GPP2 CDMA2000 (e.g., 1×RTT, 1×EV-DO, HRPD, eHRPD), or combinations of them, among others. Note that if the base station 102A is implemented in the context of LTE, it may alternately be referred to as an eNodeB' or 'eNB.' Note that if the base station 102A is implemented in the context of 5G NR, it may alternately be referred to as gNodeB' or 'gNB.'

The base station 102A is equipped to communicate with a network 100 (e.g., a core network of a cellular service provider, a telecommunication network such as a public switched telephone network (PSTN), or the Internet, or combinations of them, among others). Thus, the base station 102A may facilitate communication between the user devices and between the user devices and the network 100. In particular, the cellular base station 102A may provide UEs 106 with various telecommunication capabilities, such as voice, SMS and data services.

The base station 102A and other similar base stations (such as base stations 102B . . . 102N) operating according to the same or a different cellular communication standard may comprise a network of cells, which may provide continuous or nearly continuous overlapping service to UEs 106A-N and similar devices over a geographic area in accordance with, for example, one or more cellular communication standards.

Thus, while the base station 102A may act as a "serving cell" for the UEs 106A-N as illustrated in FIG. 1, each UE 106 may also be capable of receiving signals from (and possibly within communication range of) one or more other cells (which might be provided by base stations 102B-N or any other base stations, or by UEs themselves), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, the base stations 102A-B illustrated in FIG. 1 might be macro cells, while the base station 102N might be a micro cell. Other configurations are also possible.

In some embodiments, the base station 102A may be a next generation base station, e.g., a 5G New Radio (5G NR) base station, or "gNB." In some embodiments, a gNB may be connected to a legacy evolved packet core (EPC) network or to a NR core (NRC) network, among others. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) or peer-to-peer wireless communication protocol (e.g., Bluetooth or Wi-Fi peer-to-peer), or both, in addition to at least one cellular communication protocol (e.g., GSM, UMTS (associated with, for example, WCDMA or TD-SCDMA air interfaces), LTE, LTE-A, 5G NR, HSPA, or 3GPP2 CDMA2000 (e.g., 1×RTT, 1×EV-DO, HRPD, eHRPD), or combinations of them, among others). The UE 106 may also (or alternatively) be configured to communicate using one or more global navigational satellite systems (GNSS), such as GPS or GLONASS, one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
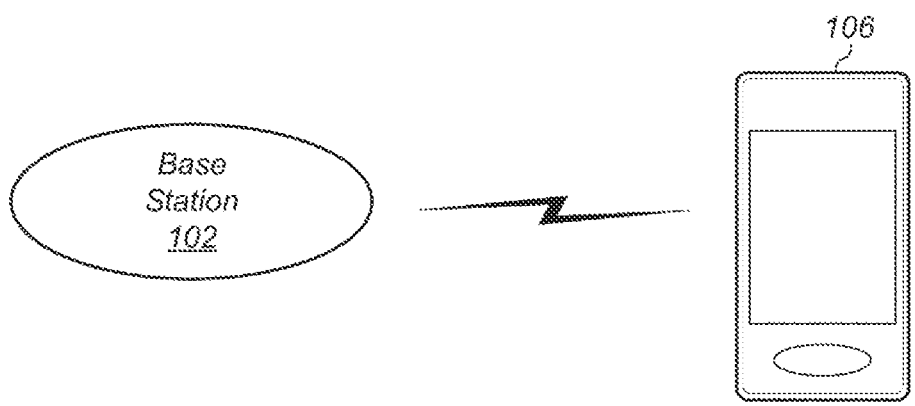
FIG. 2 illustrates a base station (BS) in communication with a user equipment (UE) device.

FIG. 2 illustrates user equipment 106 (e.g., one of the devices 106A through 106N) in communication with a base station 102. The UE 106 may be a device with cellular communication capability such as a mobile phone, a handheld device, a computer or a tablet, or virtually any type of wireless device, including wireless sensors, surveillance equipment, or wearables devices, among others. In some implementations, the UE 106 is a reduced capability or "light" UE.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE

106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive or transmit chain, or both, between multiple wireless communication technologies, such as those discussed above.

In some implementations, the UE 106 includes separate transmit or receive chains, or both, (e.g., including separate antennas and other radio components) for each wireless communication protocol with which it is configured to communicate. In some implementations, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
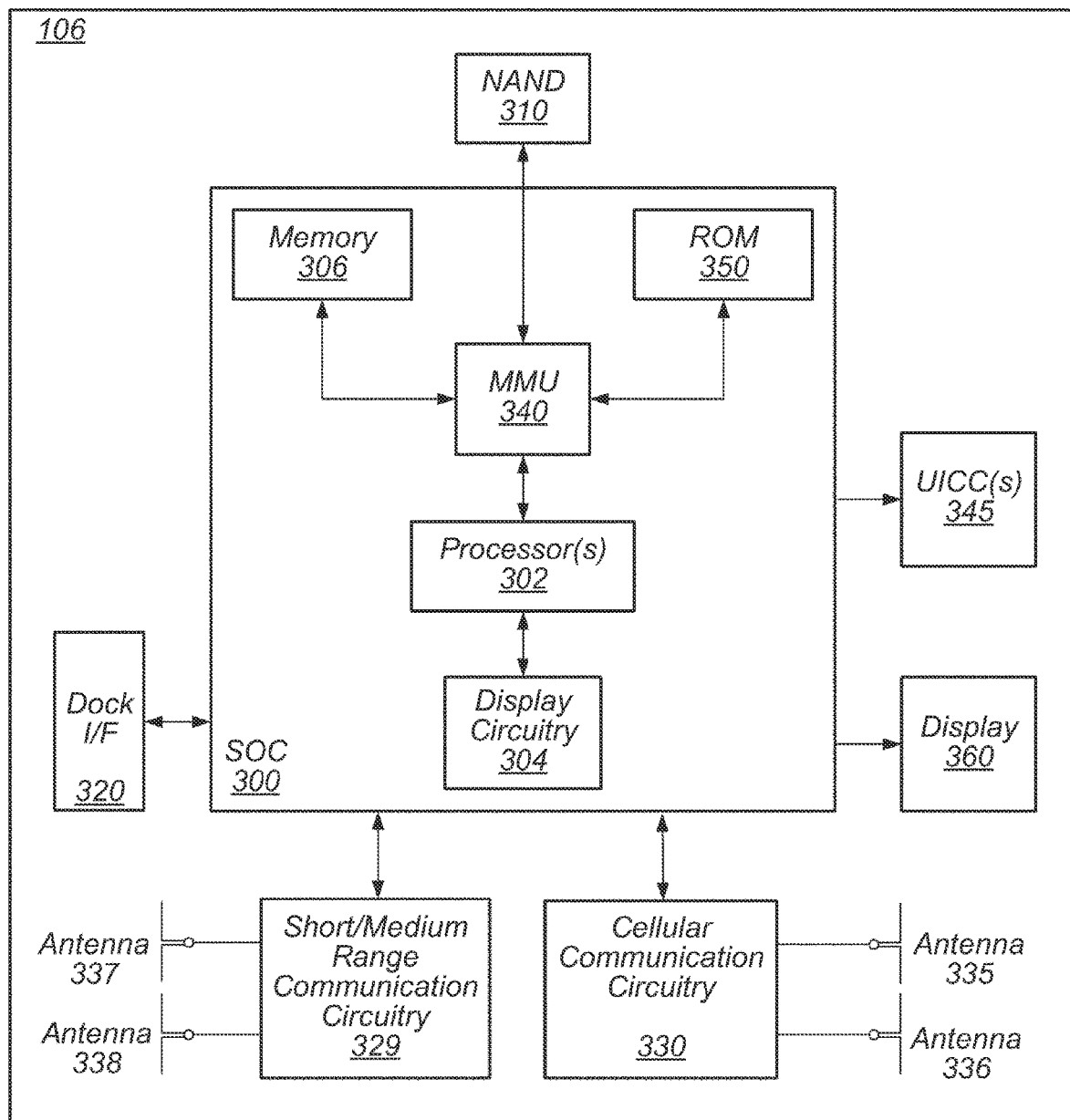
FIG. 3 illustrates an example block diagram of a UE.

FIG. 3 illustrates an example block diagram of a communication device 106. It is noted that the block diagram of the communication device 106 in FIG. 3 is only one example of a possible communication device. In some implementations, communication device 106 may be a user equipment (UE) device, a mobile device or mobile station, a wireless device or wireless station, a desktop computer or computing device, a mobile computing device (e.g., a laptop, notebook, or portable computing device), a tablet, a wireless sensor, a video surveillance system, or a wearable device, or a combination of them, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers), a display 360, which may be integrated with or external to the communication device 106, and cellular communication circuitry 330 such as for 5G NR, LTE, GSM, among others, and short to medium range wireless communication circuitry 329 (e.g., Bluetooth™ and WLAN circuitry). In some embodiments, the communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336. The short to medium range wireless communication circuitry 329 may also couple (e.g., communicatively; directly or indirectly) to one or more antennas, such as antennas 337 and 338. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 or cellular communication circuitry 330, or both, may include multiple receive chains and multiple transmit chains for receiving and transmitting multiple spatial streams, such as in a multiple-input multiple output (MIMO) configuration.

In some implementations, the cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some implementations, the cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include or be configured for use with one or more user interface elements. The user interface elements may include any of various elements, such as the display 360 (which may be a touchscreen display), a keyboard (which may be a discrete keyboard or may be implemented as part of a touchscreen display), a mouse, a microphone, a speaker, one or more cameras, one or more buttons, or combinations of them, among various other elements capable of providing information to a user or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some implementations, the MMU 340 may be included as a portion of the processor(s) 302.

The communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

The processor 302 may include one or more processing elements. For example, the processor 302 may include one or more integrated circuits (ICs) that are configured to perform the functions of the processor 302. Each integrated circuit may include circuitry (e.g., first circuitry, second circuitry, among other circuitry) configured to perform the functions of processor(s) 302.

Further, the cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
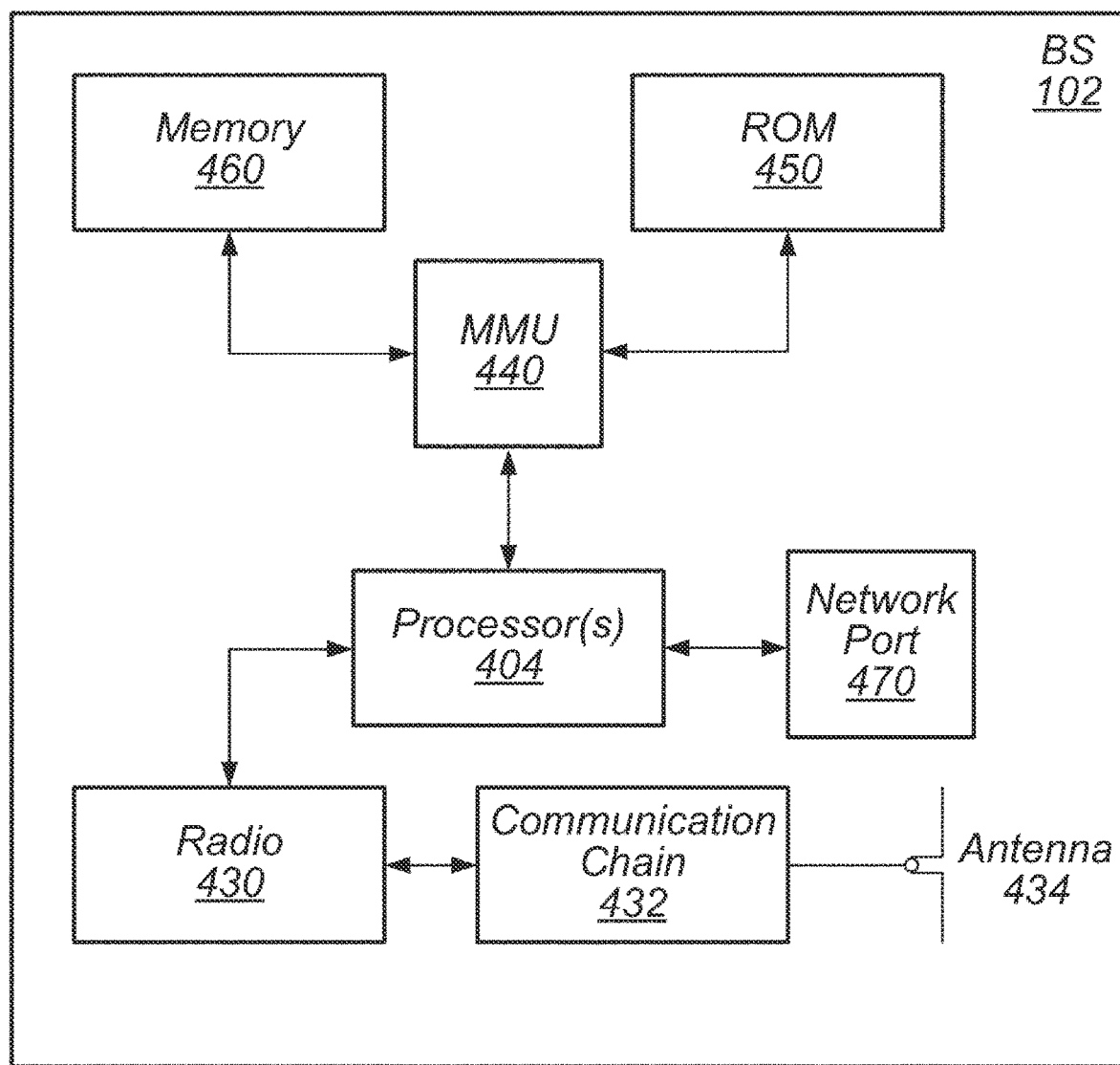
FIG. 4 illustrates an example block diagram of a BS.

FIG. 4 illustrates an example block diagram of a base station 102. It is noted that the base station of FIG. 4 is an example of a possible base station. As shown, the base station 102 includes processor(s) 404 which may execute program instructions for the base station 102. The processor(s) 404 may be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with reference to FIGS. 1 and 2.

The network port 470 (or an additional network port) may also or alternatively be configured to couple to a cellular network, e.g., a core network of a cellular service provider. The core network may provide mobility related services or other services to a plurality of devices, such as UE devices 106. In some implementations, the network port 470 couples a telephone network using the core network, or the core network may provide a telephone network (e.g., among other UE devices serviced by the cellular service provider).

In some implementations, the base station 102 is a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs).

In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, or Wi-Fi, or combinations of them, among others.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, or combinations of them, among others).

The BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In some implementations, the processor(s) 404 are comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, among other circuitry) configured to perform the functions of the processor(s) 404.

In some implementations, the radio 430 is comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
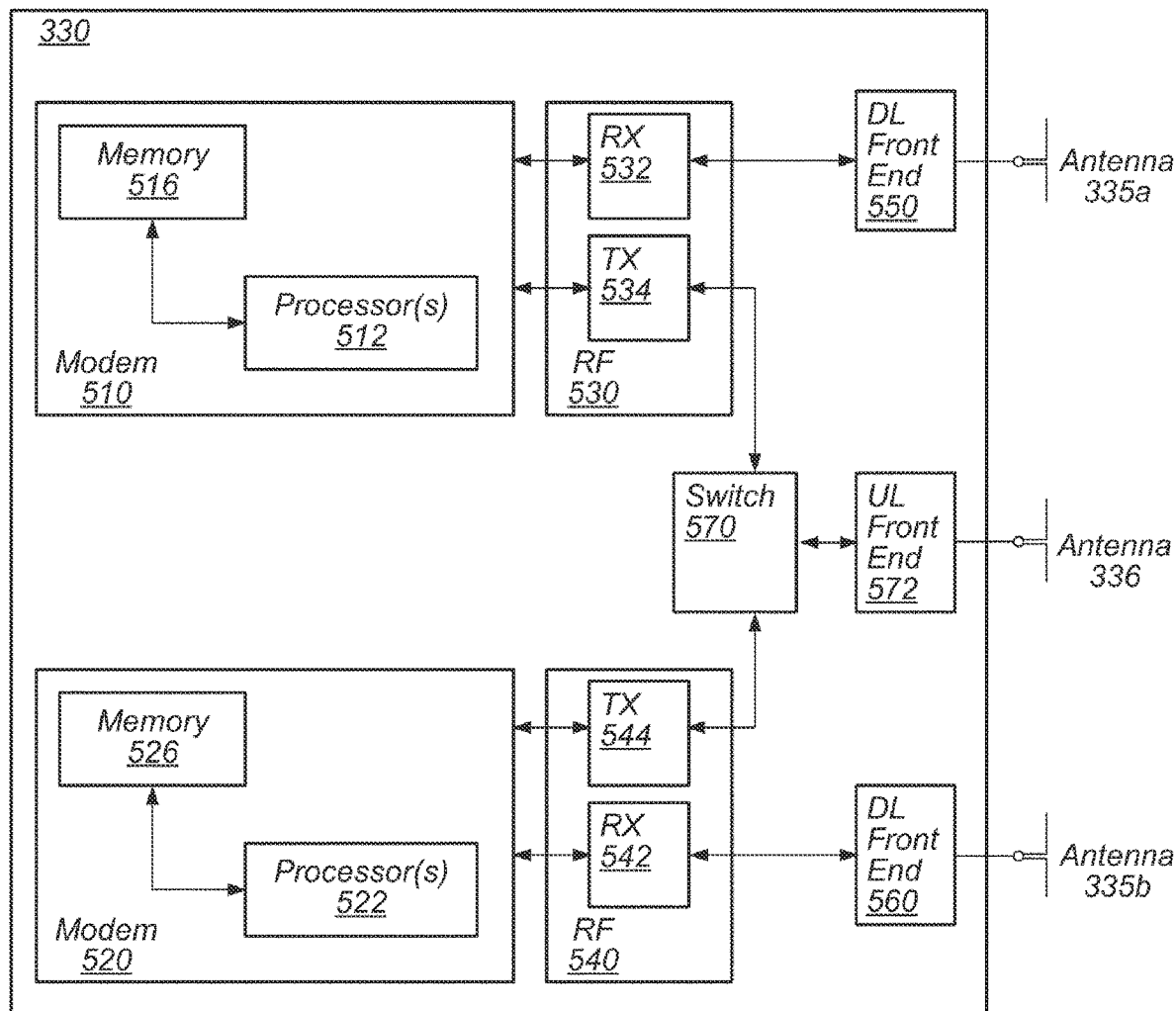
FIG. 5 illustrates an example block diagram of cellular communication circuitry.

FIG. 5 illustrates an example block diagram of cellular communication circuitry 330. It is noted that the block diagram of the cellular communication circuitry 330 of FIG. is an example of a possible cellular communication circuit. In some implementations, the cellular communication circuitry 330 may be included in a communication device, such as the communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet, a wireless sensor, surveillance equipment, or wearables devices, or a combination of them, among other devices.

The cellular communication circuitry 330 may couple (e.g., communicatively; directly or indirectly) to one or more antennas, such as antennas 335 a-b and 336 as shown (in FIG. 3). In some implementations, the cellular communication circuitry 330 includes or is communicatively coupled to dedicated receive chains, processors, or radios for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

The modem 510 includes one or more processors 512 and a memory 516 in communication with the processors 512. The modem 510 is in communication with a radio frequency (RF) front end 530. The RF front end 530 may include circuitry for transmitting and receiving radio signals. For example, the RF front end 530 includes receive circuitry (RX) 532 and transmit circuitry (TX) 534. In some implementations, the receive circuitry 532 is in communication with downlink (DL) front end 550, which may include circuitry for receiving radio signals via antenna 335a.

Similarly, the modem 520 includes one or more processors 522 and a memory 526 in communication with the processors 522. The modem 520 is in communication with an RF front end 540. The RF front end 540 may include circuitry for transmitting and receiving radio signals. For example, the RF front end 540 may include receive circuitry 542 and transmit circuitry 544. In some implementations, the receive circuitry 542 is in communication with DL front end 560, which may include circuitry for receiving radio signals via antenna 335b.

The modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), the processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement some or all of the features described herein.

The processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

The modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, the processors 522 may include one or more processing elements. Thus, the processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In 5G NR and other wireless communication networks, uplink (UL) transmission from a UE (e.g., the UE 106) to a cell (e.g., the BS 102) is supported a codebook-based transmission scheme in some instances. In general, in a codebook-based transmission scheme a UE transmits information about its transmission capabilities and one or more sounding resource signals (SRSs) to the base station using, for example, a physical uplink shared channel (PUSCH). Based at least in part on this information, the base station selects parameters to configure the UE for subsequent uplink transmissions and transmits this information to the UE as, for example, downlink control information (DCI) or other higher layer signaling (e.g., a radio resource control (RRC) message). The configuration information can include SRS configuration information (e.g., SRS resource indicator (SRI)) indicating the selected SRS resource(s) and a transmit precoder matrix indicator (TPMI) indicating a precoder selected from an uplink codebook for precoding information over the port(s) in a selected SRS resource, among other information. The UE then performs uplink transmissions based on the information received from the base station.

Specifically, as defined in release 16 of the 3GPP technical specification (TS) 38.211, for codebook based transmission, PUSCH can be scheduled by DCI format 0_0, DCI format 0_1, DCI format 0_2 or semi-statically configured to operate (e.g., according to clause 6.1.2.3 of 3GPP TS 38.211). If this PUSCH is scheduled by DCI format 0_1, DCI format 0_2, or semi-statically configured to operate, the UE can determine its PUSCH transmission precoder based on SRI, TPMI and the transmission rank, where the SRI, TPMI and the transmission rank are given by DCI fields of SRS resource indicator and precoding information and number of layers (e.g., in clauses 7.3.1.1.2 and 7.3.1.1.3 of 3GPP TS 38.212) for DCI format 0_1 and 0_2, or given by srs-ResourceIndicator and precodingAndNumberOfLayers (e.g., according to clause 6.1.2.3 of 3GPP TS 38.211). The SRS-ResourceSet(s) applicable for a PUSCH transmission scheduled by DCI format 0_1 and DCI format 0_2 can be defined by the entries of the higher layer parameter srs-ResourceSetToAddMod-List and srs-ResourceSetToAddModList-ForDCIFormat0_2 in SRS-config, respectively. The TPMI can be used to indicate the precoder to be applied over the layers {0 . . . v−1} and that corresponds to the SRS resource selected by the SRI when multiple SRS resources are configured, or if a single SRS resource is configured TPMI is used to indicate the precoder to be applied over the layers {0 . . . v−1} and that corresponds to the SRS resource. The transmission precoder can be selected from the uplink codebook that has a number of antenna ports equal to higher layer parameter nrofSRS-Ports in SRS-Config (e.g., as defined in clause 6.3.1.5 of 3GPP TS 38.211). When the UE is configured with the higher layer parameter txConfig set to 'codebook,' the UE can be configured with at least one SRS resource. The indicated SRI in slot n is associated with the most recent transmission of SRS resource identified by the SRI, where the SRS resource is prior to the PDCCH carrying the SRI.

To achieve optimal UL transmission, a UE can use one or more precoders that support full power transmission over the selected ports. However, in current codebook-based coding schemes (e.g., those defined in 3GPP 5G NR release 15 and earlier), a UE cannot arbitrarily indicate a precoder (e.g., a precoder matrix) or set of precoders (e.g., precoder matrices) that supports full power transmission. For example, in 3GPP release 15, if the precoder matrix selected by the BS in the TPMI does not use all of the UE ports, then full power transmission is not supported, since the maximum transmit power is scaled by the non-zero ports divided by the total number of ports.

In 3GPP 5G NR release 16, full power transmission is conditionally supported for non-coherent or partial-coherent UEs. As used herein, "full," "partial," "non-coherent" are referred to as the three examples of UE coherence type or capability, where the term "coherence" implies a subset of antenna ports at the UE that can be used to transmit a layer of UL data coherently. In accordance with release 16, a UE can be configured to operate in either Mode 1 or Mode 2 upon reception of the higher layer parameter (e.g., ULFPTxModes). For UL transmission Mode 1, new TPMI are added to the new CodebookSubset with the existing SRS configuration. The UE can be configured with one or two SRS resources with same number of SRS ports within an SRS resource set.

For UL transmission Mode 2, the existing CodebookSubset can be used, but the SRS resource set is allowed to have SRS resource(s) with different numbers of ports. Specifically, the UE can be configured with one SRS resource or multiple SRS resources with same or different number of SRS ports within an SRS resource set with usage. Up to 2 different spatial relations (maxNumberConfiguredSpatialRelations) can be configured for all SRS resources. A maximum of 4 SRS resources to an SRS resource set can be supported.

A UE is also allowed to indicate a predefined group of TPMIs that support full power UL transmission in Mode 2. An example of these groups is shown in the following table:

| TPMI Group | Precoder Matrix |
|---|---|
| G0 | $\left\{\frac{1}{2}\begin{bmatrix}1\\0\\0\\0\end{bmatrix}\right\}$ |
| G1 | $\left\{\frac{1}{2}\begin{bmatrix}1\\0\\0\\0\end{bmatrix},\frac{1}{2}\begin{bmatrix}0\\0\\1\\0\end{bmatrix}\right\}\left\{\frac{1}{2}\begin{bmatrix}1&0\\0&0\\0&1\\0&0\end{bmatrix}\right\}$ |
| G2 | $\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\}\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\}$ |
| | $\left\{\frac{1}{2}\begin{bmatrix}1&0&0\\0&1&0\\0&0&1\\0&0&0\end{bmatrix}\right\}$ |
| G3 | $\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\}\left\{\frac{1}{2}\begin{bmatrix}1&0&0\\0&1&0\\0&0&1\\0&0&0\end{bmatrix}\right\}$ |
| G4 | $\left\{\frac{1}{2}\begin{bmatrix}1\\1\\1\\1\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\}\left\{\frac{1}{2}\begin{bmatrix}1&0\\0&0\\0&1\\0&0\end{bmatrix}\right\}$ |
| G5 | $\left\{\frac{1}{2}\begin{bmatrix}1\\1\\1\\1\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\}$ |
| | $\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\}\left\{\frac{1}{2}\begin{bmatrix}1&0&0\\0&1&0\\0&0&1\\0&0&0\end{bmatrix}\right\}$ |
| G6 | $\left\{\frac{1}{2}\begin{bmatrix}1\\1\\1\\1\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\}$ |
| | $\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\}$ |
| | $\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix}\right\}$ |
| | $\left\{\frac{1}{2}\begin{bmatrix}1&0&0\\0&1&0\\0&0&1\\0&0&0\end{bmatrix}\right\}$ |

The indication of a TPMI group can be made per frequency band per frequency band combination. The group choice is limited. For 2 ports, 2 bits (e.g., a 2-bit bitmap) can be used to indicate TPMI(s) which, for example, can deliver UL full power (or delivery another particular power level desired by the UE). For 4 ports, 2 bits (e.g., a 2-bit index) can be used for non-coherent UEs, and 4 bits (e.g., a 4-bit index) can be used for partial-coherent UEs. In some implementations, a 4-port non-coherent UE can indicate groups G0-G3 (e.g., using 2 bits), and a 4-port partial-coherent UE can use groups G0-G6 (e.g., using 4 bits).

Although release 16 provides additional support for full power UL transmission relative to release 15, it is not a complete solution. For example, Mode 1 only supports a limited number of TPMI and a limited UE antenna virtualization choices. In Mode 2, indication of which TPMI that supports full power is complicated, and it is complicated for the base station to decide how to configure the SRS resource(s) for the UE. Moreover, neither mode allows a UE to arbitrarily select a precoder or set of precoders for full power UL transmission (or another particular power arrangement to, for example, reduce power consumption at the UE). Instead, the UE must rely on predefined codebooks or groups that may not be optimal in many situations.

The techniques described here provide for enhanced UL full power transmission relative to, for example, Mode 2 UL transmission in 5G NR. In general, for a 4 transmitter antenna UE, each transmitter can have a 23 dBm, 20 dBm, or 17 dBm power amplifier (PA) configuration. However, as noted above, current 3GPP 5G NR standards cannot support full power transmission (or, more generally, the flexibility to select a particular transmission power level) for all UE architectures in all situations.

Accordingly, in some implementations, the techniques described here can allow a UE to define arbitrary TPMI groups in addition to or in place of those defined under the 5G NR standards. The UE-defined TPMI groups can be provided to the BS and indicated on a per frequency band per frequency band combination basis for use in UL transmissions. For example, for a partial-coherent UE, 4 bits can be used by the UE to indicate a TPMI group, which can support up to 16 groups. However, only 7 groups are currently defined in the standard as shown in the table above. Using the techniques described here, a UE can generate one or more TPMI lists of arbitrarily selected TPMIs and can signal the TPMI list(s) to the BS to be stored or otherwise associated as a TPMI group for the UE. In some implementations, such as where the UE is a partial-coherent UE, the TPMI list(s) can be used for group 7-15 or a subset of group 7-15. In some implementations, the TPMI list(s) can replace one or more hardcoded groups and used instead of a hardcoded TPMI list for each group.

For each group, a UE can indicate to a BS a TPMI list which contains a selection the TPMI(s) for inclusion in the group. In some implementations, the TPMI list can be indicated in the form of a bitmap, in which a 1 in bitmap means a corresponding TPMI (e.g., a TPMI associated with a TPMI index indicated by the bitmap) supports full power transmission, and a 0 in the bitmap means that the corresponding TPMI does not support full power transmission. In some implementations, the TPMI list or group can be representative of the TPMIs that support a particular power level other than full power transmission. The TPMI list for each group can be signaled using a radio resource control (RRC) message, which may be part of the UE capability reporting. In some implementations, a UE can temporarily or permanently change its TPMI list for each group using a RRC message to, for example, address a UE RF configuration change or UE thermal or power consumption concern, among others.

In some implementations, the TPMI list or group can be selected from the TPMIs defined in the 3GPP 5G NR standard (e.g., in 3GPP TS 38.211) shown in the following tables (although other TPMIs or precoder matrices are contemplated):

Precoding Matrix for Single-Layer Transmission
Using Two Antenna Ports

| TPMI index | Precoding Matrix (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Precoding Matrix for Single-Layer Transmission
Using Four Antenna Ports with Transform
Precoding Enabled

| TPMI index | Precoding Matrix (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Precoding Matrix for Single-Layer Transmission Using Four Antenna Ports with Transform Precoding Disabled

| TPMI index | Precoding Matrix (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

Precoding Matrix for Two-Layer Transmission Using Two Antenna Ports with Transform Precoding Disabled

| TPMI index | Precoding Matrix (ordered from left to right in increasing order of TPMI index) |
|---|---|
| 0-2 | $\frac{1}{\sqrt{2}}\begin{bmatrix}1&0\\0&1\end{bmatrix}$ $\frac{1}{2}\begin{bmatrix}1&1\\1&-1\end{bmatrix}$ $\frac{1}{2}\begin{bmatrix}1&1\\j&-j\end{bmatrix}$ |

Precoding Matrix for Two-Layer Transmission Using Four Antenna Ports with Transform Precoding Disabled

| TPMI index | Precoding Matrix (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ — — |

Precoding Matrix for Three-Layer Transmission
Using Four Antenna Ports with Transform
Precoding Disabled

| TPMI index | Precoding Matrix (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

Precoding Matrix for Four-Layer Transmission
Using Four Antenna Ports with Transform
Precoding Disabled

| TPM Index | Precoding Matrix (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

In some implementations, some or all of the following TPMIs can be used to create TPMI list for each group instead of or in addition to those described above. In some implementations, these TPMIs or TPMI groups, or both, can be added the 3GPP 5G NR standard (e.g., for partial-coherent UEs) and hardcoded at each BS or UE, or both.

| TPMI Group | Precoder Matrix |
|---|---|
| G7 | $\left\{ \frac{1}{2}\begin{bmatrix} 1 & 0 \\ 0 & 1 \\ 0 & 0 \\ 0 & 0 \end{bmatrix} \right\}$ |
| G8 | $\left\{ \frac{1}{2}\begin{bmatrix} 1 \\ 0 \\ 0 \\ 0 \end{bmatrix} \right\} \left\{ \frac{1}{2}\begin{bmatrix} 1 & 0 \\ 0 & 1 \\ 0 & 0 \\ 0 & 0 \end{bmatrix} \right\}$ |
| G9 | $\left\{ \frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \frac{1}{2}\begin{bmatrix} 1 \\ 0 \\ -1 \\ 0 \end{bmatrix}, \frac{1}{2}\begin{bmatrix} 1 \\ 0 \\ j \\ 0 \end{bmatrix}, \frac{1}{2}\begin{bmatrix} 1 \\ 0 \\ -j \\ 0 \end{bmatrix} \right\} \left\{ \frac{1}{2}\begin{bmatrix} 1 & 0 \\ 0 & 0 \\ 0 & 1 \\ 0 & 0 \end{bmatrix} \right\}$ |
| G10 | $\left\{ \frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \frac{1}{2}\begin{bmatrix} 1 \\ 0 \\ -1 \\ 0 \end{bmatrix}, \frac{1}{2}\begin{bmatrix} 1 \\ 0 \\ j \\ 0 \end{bmatrix}, \frac{1}{2}\begin{bmatrix} 1 \\ 0 \\ -j \\ 0 \end{bmatrix} \right\}$ |
| G11 | $\left\{ \frac{1}{2}\begin{bmatrix} 1 & 0 \\ 0 & 1 \\ 0 & 0 \\ 0 & 0 \end{bmatrix}, \frac{1}{2}\begin{bmatrix} 1 & 0 \\ 0 & 0 \\ 0 & 1 \\ 0 & 0 \end{bmatrix}, \frac{1}{2}\begin{bmatrix} 0 & 0 \\ 1 & 0 \\ 0 & 1 \\ 0 & 0 \end{bmatrix} \right\} \left\{ \frac{1}{2}\begin{bmatrix} 1 & 0 \\ 0 & 1 \\ 0 & 0 \\ 0 & 0 \end{bmatrix} \right\}$ $\left\{ \frac{1}{2}\begin{bmatrix} 1 \\ 0 \\ 0 \\ 0 \end{bmatrix}, \frac{1}{2}\begin{bmatrix} 0 \\ 1 \\ 0 \\ 0 \end{bmatrix}, \frac{1}{2}\begin{bmatrix} 1 \\ 0 \\ 1 \\ 0 \end{bmatrix}, \frac{1}{2}\begin{bmatrix} 1 \\ 0 \\ -1 \\ 0 \end{bmatrix}, \frac{1}{2}\begin{bmatrix} 1 \\ 0 \\ j \\ 0 \end{bmatrix}, \frac{1}{2}\begin{bmatrix} 1 \\ 0 \\ -j \\ 0 \end{bmatrix} \right\}$ $\left\{ \frac{1}{2}\begin{bmatrix} 1 & 0 \\ 0 & 1 \\ 0 & 0 \\ 0 & 0 \end{bmatrix}, \frac{1}{2}\begin{bmatrix} 1 & 0 \\ 0 & 0 \\ 0 & 1 \\ 0 & 0 \end{bmatrix}, \frac{1}{2}\begin{bmatrix} 0 & 0 \\ 1 & 0 \\ 0 & 1 \\ 0 & 0 \end{bmatrix} \right\} \left\{ \frac{1}{2}\begin{bmatrix} 1 & 0 \\ 0 & 1 \\ 0 & 0 \\ 0 & 0 \end{bmatrix} \right\}$ |
| G12 | $\left\{ \frac{1}{2}\begin{bmatrix} 1 \\ 0 \\ 0 \\ 0 \end{bmatrix}, \frac{1}{2}\begin{bmatrix} 0 \\ 1 \\ 0 \\ 0 \end{bmatrix}, \frac{1}{2}\begin{bmatrix} 1 \\ 0 \\ 1 \\ 0 \end{bmatrix}, \frac{1}{2}\begin{bmatrix} 1 \\ 0 \\ -1 \\ 0 \end{bmatrix}, \frac{1}{2}\begin{bmatrix} 1 \\ 0 \\ j \\ 0 \end{bmatrix}, \frac{1}{2}\begin{bmatrix} 1 \\ 0 \\ -j \\ 0 \end{bmatrix} \right\}$ $\left\{ \frac{1}{2}\begin{bmatrix} 1 & 0 \\ 0 & 1 \\ 0 & 0 \\ 0 & 0 \end{bmatrix}, \frac{1}{2}\begin{bmatrix} 1 & 0 \\ 0 & 0 \\ 0 & 1 \\ 0 & 0 \end{bmatrix}, \frac{1}{2}\begin{bmatrix} 0 & 0 \\ 1 & 0 \\ 0 & 1 \\ 0 & 0 \end{bmatrix} \right\} \left\{ \frac{1}{2}\begin{bmatrix} 1 & 0 \\ 0 & 1 \\ 0 & 0 \\ 0 & 0 \end{bmatrix} \right\}$ |

-continued

| TPMI Group | Precoder Matrix |
|---|---|
| G13 | $\left\{\dfrac{1}{2}\begin{bmatrix}1\\1\\0\\0\end{bmatrix}, \dfrac{1}{2}\begin{bmatrix}0\\1\\0\\0\end{bmatrix}\right\}\left(\dfrac{1}{2}\begin{bmatrix}1&0\\1&0\\0&0\\0&0\end{bmatrix}\right)$ |
| G14 | $\left\{\dfrac{1}{2}\begin{bmatrix}1\\1\\0\\0\end{bmatrix}, \dfrac{1}{2}\begin{bmatrix}0\\0\\1\\0\end{bmatrix}, \dfrac{1}{2}\begin{bmatrix}1\\1\\1\\0\end{bmatrix}, \dfrac{1}{2}\begin{bmatrix}1\\0\\-1\\0\end{bmatrix}, \dfrac{1}{2}\begin{bmatrix}1\\1\\j\\0\end{bmatrix}, \dfrac{1}{2}\begin{bmatrix}1\\0\\-j\\0\end{bmatrix}\right\}\left(\dfrac{1}{2}\begin{bmatrix}1&0\\0&0\\0&1\\0&0\end{bmatrix}\right)$ |

In some implementations, UL full power transmission can be improved by deriving implied directives from capability information reported by a UE. For example, under the release 16 of the 3GPP 5G NR standard, TPMI group indication to support full power transmission is optional for a UE to report. Accordingly, the techniques described here can be used to derive a default behavior when a UE indicates that it is capable of full power transmission (e.g., Mode 2 full power transmission), but it does not indicate any TPMI (e.g., a TPMI group or list) to support full power transmission. In some implementations, when a UE indicates that it is capable of full power transmission but does not indicate a TPMI, it can be implied that the UE supports full power transmission, but that additional SRS is necessary. In response, the BS can configure the UE (e.g., using a RRC message) with a 1-port SRS to support rank 1 full power transmission with UE antenna virtualization, a 2-port SRS to support rank 2 full power transmission with UE antenna virtualization, or a TPMI to support rank 3 full power transmission, or combinations of them. The TPMI to support rank 3 full power transmission can be as follows:

$$\dfrac{1}{2}\begin{bmatrix}1 & 0 & 0\\0 & 1 & 0\\0 & 0 & 1\\0 & 0 & 0\end{bmatrix}$$

In some implementations, when a UE indicates that it is capable of full power transmission but does not indicate a TPMI group, it can be implied that the UE supports full power transmission for all TPMI, and that no additional SRS is necessary. For example, the UE can apply antenna virtualization during the PUSCH transmission, but the UE does not need any additional SRS with less than 4 ports to perform virtualized sounding.

In some implementations, the techniques described here can be used to derive an implied SRS configuration for a 2-port UE based on the bitmap used to indicate the TPMI supporting full power transmission. For example, for a 2-port UE operating in full power transmission mode 2, a 2-bit bitmap can be used to indicate which TPMI supports full power transmission. Note that, as of 3GPP release 15, for 2 port UEs, two TPMIs do not support full power: (1, 0), and (0, 1). In some implementations, when a 2-port UE indicates that it is capable of full power transmission, and the TPMI bitmap is (1, 1), it can be implied that: the UE requests additional SRS with 1-port to support rank 1 full power transmission with antenna virtualization; that the UE supports full power transmission for both TPMIs (e.g., (1, 0) and (0, 1)), but that the UE does not require additional 1-port SRS for virtualized sounding; or that the UE requires PA to physical layer (PHY) antenna switching with additional switching delay between TPMI, or combinations of them. In response, the BS can configure the BS with the requested configuration (e.g., using a RRC message).

In some implementations, when a 2-port UE indicates that it is capable of full power transmission and the bitmap is (0, 0), it can be implied that the UE request additional SRS with 1-port to support rank 1 full power transmission with antenna virtualization. In response, the BS can configure the BS with the requested SRS configuration (e.g., using a RRC message). Although discussed in the context of a 2-port UE, these techniques can be extended to UEs having another number of ports in some implementations.

As noted above, 3GPP 5G NR release 15 only allows SRS resources to be configured with the same number of ports for sounding. In 3GPP 5G NR release 16, full power transmission mode 2 allows a SRS resource to be configured with a different number of ports (e.g., to facilitate the UE sounding with antenna virtualization). However, the specification lacks an explicit scheme for the UE to request additional SRS resources with having a different number of ports. Accordingly, in some implementations, a UE is can be configured to indicate TPMI (e.g., TPMI groups or lists) for multiple ports, and this information can be used to derive a number of ports for a SRS resource. For example, for a 4-port or transmitter (or both) UE, the UE can report TPMI for 4 ports as well as for 2 ports. The BS can be configured to interpret this indication as a request by the UE for an additional 2-port SRS for sounding. Similar techniques can be applied to UEs having a different number of ports. In some implementations, the BS can assume that the UE always needs (or always doesn't need) a 1-port SRS.

In some implementations, the TPMI group reporting is mapped to SRS resource requesting. For example, if a UE indicates one or more TPMI groups, each of which include a rank 1 TPMI, the BS can assume that the UE requests a 1-port SRS. Similarly, if a UE indicates one or more TPMI groups, each of which include a rank 2 TPMI, the BS can assume that the UE requests a 2-port SRS. In some implementations, these mappings can be hardcoded at the BS or the UE, or both.

In some implementations, the techniques described here can be used to derive which TPMI (or TPMI group) supports full power transmission when a SRS with fewer SRS ports than UE transmitter ports is configured. To facilitate this determination in some cases, a UE can be configured to report full power transmission capability for both the number of transmitter ports and a lower number of ports. For example, a two transmitter UE can report TPMI for both 1 and 2 ports, and a four transmitter UE can report TPMI for both 2 and 4 ports. Then, when a SRS with fewer ports is configured, the BS can use the corresponding UE reported capability to configure the UE for full power transmission. In some implementations, the BS can assume that a UE supports full power transmission if a SRS with fewer ports is configured. For example, the BS can assume that a UE supports full power transmission for a 1-port SRS, that a UE supports full power transmission for a 2-port SRS for rank 1 TPMI, or that a UE supports full power transmission for a 2-port SRS on a particular rank 1 TMPI among all rank 1 TPMI, or combinations of them, among other.

Figure 6:
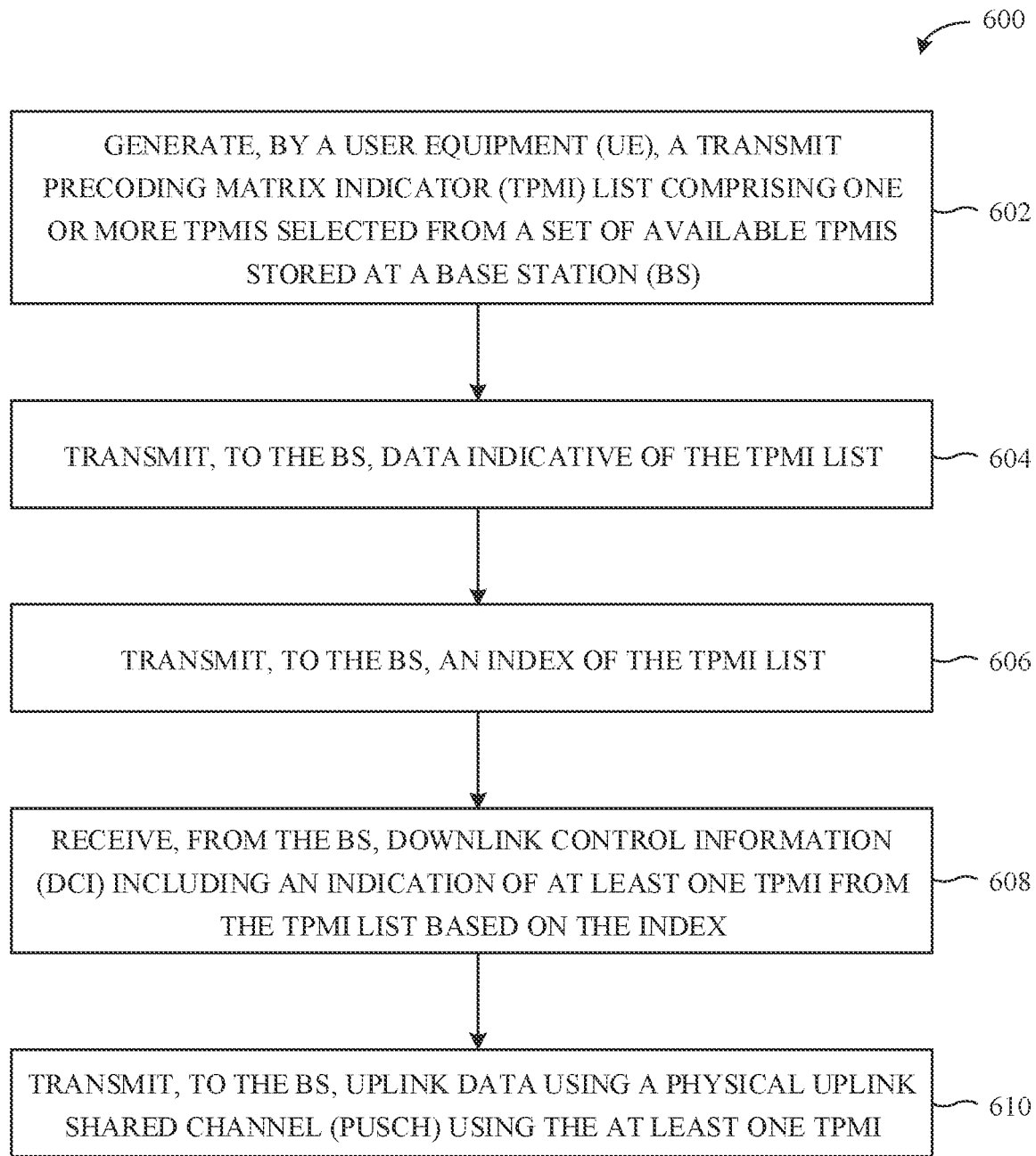
FIGS. 6 through 9 illustrate examples of enhanced full power uplink (UL) transmission.

FIG. 6 illustrates a flowchart of an example process 600 for enhancing full power uplink transmission in accordance with some aspects of the present disclosure. In some implementations, the process 600 can be performed by one or more devices or systems described here.

Operations of the process 600 include generating, by a user equipment (UE), a transmit precoding matrix indicator (TPMI) list including one or more TPMIs selected from a set of available TPMIs stored at a base station (BS) (602). For example, the UE 106 may generate the TPMI list from a set of available TPMIs stored at the BS 102. The one or more TPMIs in the TPMI list can support full power transmission by the UE. In some implementations, the TPMI list includes a bitmap indicative of the one or more TPMIs. In some implementations, the one or more TPMIs are arbitrarily selected from the set of available TPMIs at the BS. The set of available TPMIs can include, but are not limited to, those TPMIs described here and included in 3GPP TS 38.211.

Data indicative of the TPMI list is transmitted to the BS (604). In some implementations, the TPMI list is transmitted to the BS as part of the capability information reported by the UE. In some implementations, the UE alters the TPMI list to produce a second TPMI list including at least one TPMI from the set of available TPMIs that is different from the one or more TPMIs of the TPMI list, and data indicative of the second TPMI list is transmitted to the BS.

An index of the TPMI list is transmitted to the BS (606). In some implementations, the index of the TPMI list is transmitted to the BS per frequency band per frequency band combination. The TPMI list can be stored as a TPMI group for the UE at the BS, and the index can be an index of the TPMI group.

Downlink control information (DCI) including an indication of at least one TPMI from the TPMI list based on the index is received from the BS (608). The UE transmits, to the BS, uplink data on a physical uplink shared channel (PUSCH) using the at least one TPMI (610). In some implementations, the uplink data is transmitted at full power by the UE using the at least one TPMI. Although the process 600 is described from the perspective of the UE, in some implementations one or more steps of the process 600 can be carried out from the perspective of the BS as described herein.

Figure 7:
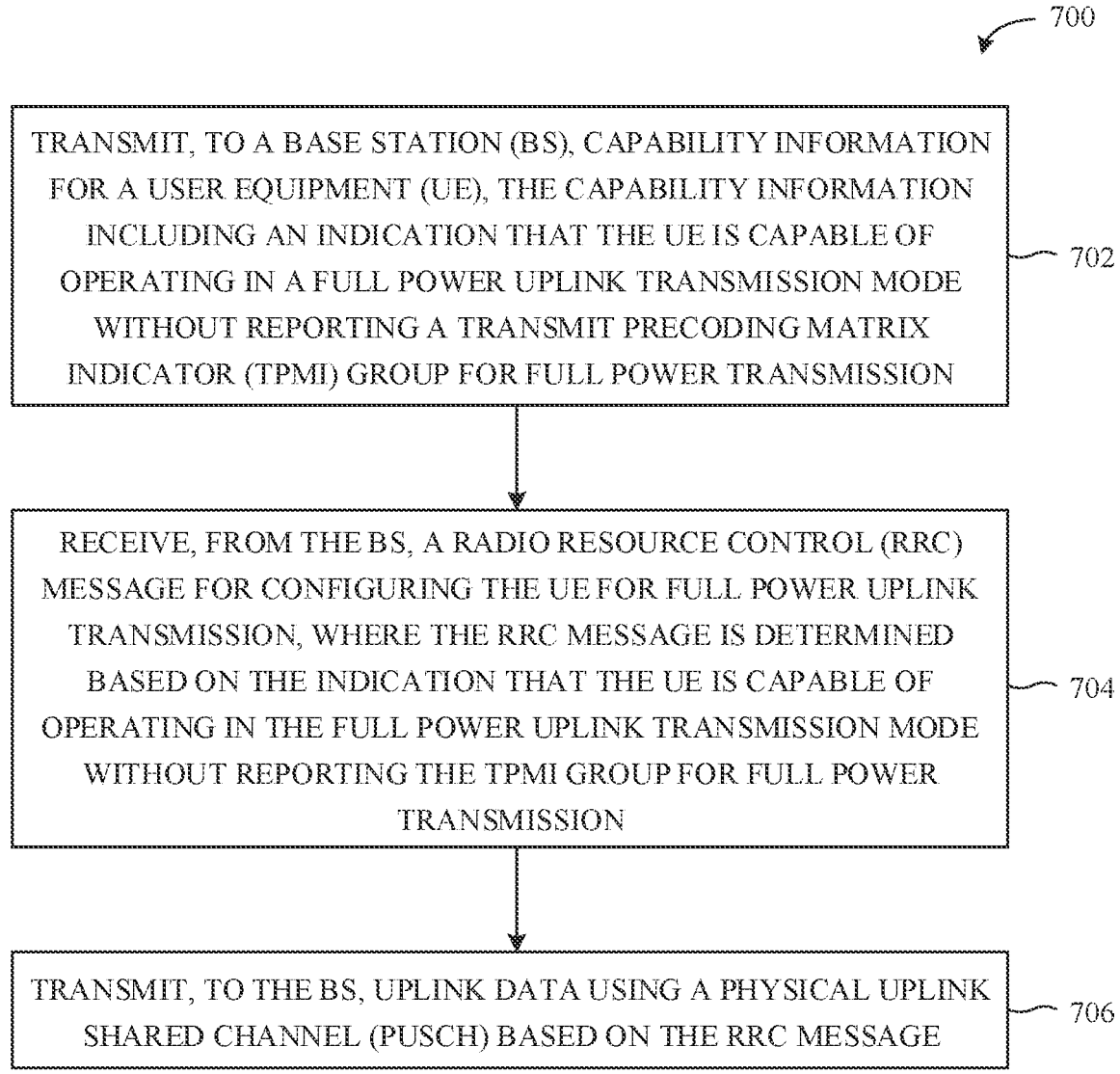

FIG. 7 illustrates a flowchart of an example process 700 for enhancing full power uplink transmission in accordance with some aspects of the present disclosure. In some implementations, the process 700 can be performed by one or more devices or systems described here.

Operations of the process 700 include transmitting, to a base station (BS), capability information for a user equipment (UE) (702). For example, the UE 106 can transmit capability information to the BS 102. The capability information includes an indication that the UE is capable of operating in a full power uplink transmission mode without reporting a transmit precoding matrix indicator (TPMI) group for full power transmission. In some implementations, the full power uplink transmission mode includes a mode two full power uplink transmission mode. In some implementations, the TPMI group is generated by the UE in accordance with the techniques described here.

A radio resource control (RRC) message is received from the BS for configuring the UE for full power uplink transmission (704). The RRC message is determined based on the indication that the UE is capable of operating in the full power uplink transmission mode without reporting the TPMI group for full power transmission. In some implementations, RRC message includes information for allocation of a SRS resource based on the indication that the UE is capable of operating in the full power uplink transmission mode without reporting the TPMI group for full power transmission. The SRS resource can include a 1-port SRS to support rank one full power uplink transmission with antenna virtualization by the UE or a 2-port SRS to support rank two full power uplink transmission with antenna virtualization by the UE, or both. In some implementations, the RRC message includes indication of a TPMI for rank three full power transmission by the UE. In some implementations, the indication that the UE is capable of operating in the full power uplink transmission mode without reporting the TPMI group for full power transmission includes an indication that no additional SRS resources are needed by the UE.

Uplink data is transmitted to the BS on a physical uplink shared channel (PUSCH) based on the RRC message (706). In some implementations, the uplink data is transmitted at full power by the UE based on the RRC message. Although the process 700 is described from the perspective of the UE, in some implementations one or more steps of the process 700 can be carried out from the perspective of the BS as described herein.

Figure 8:
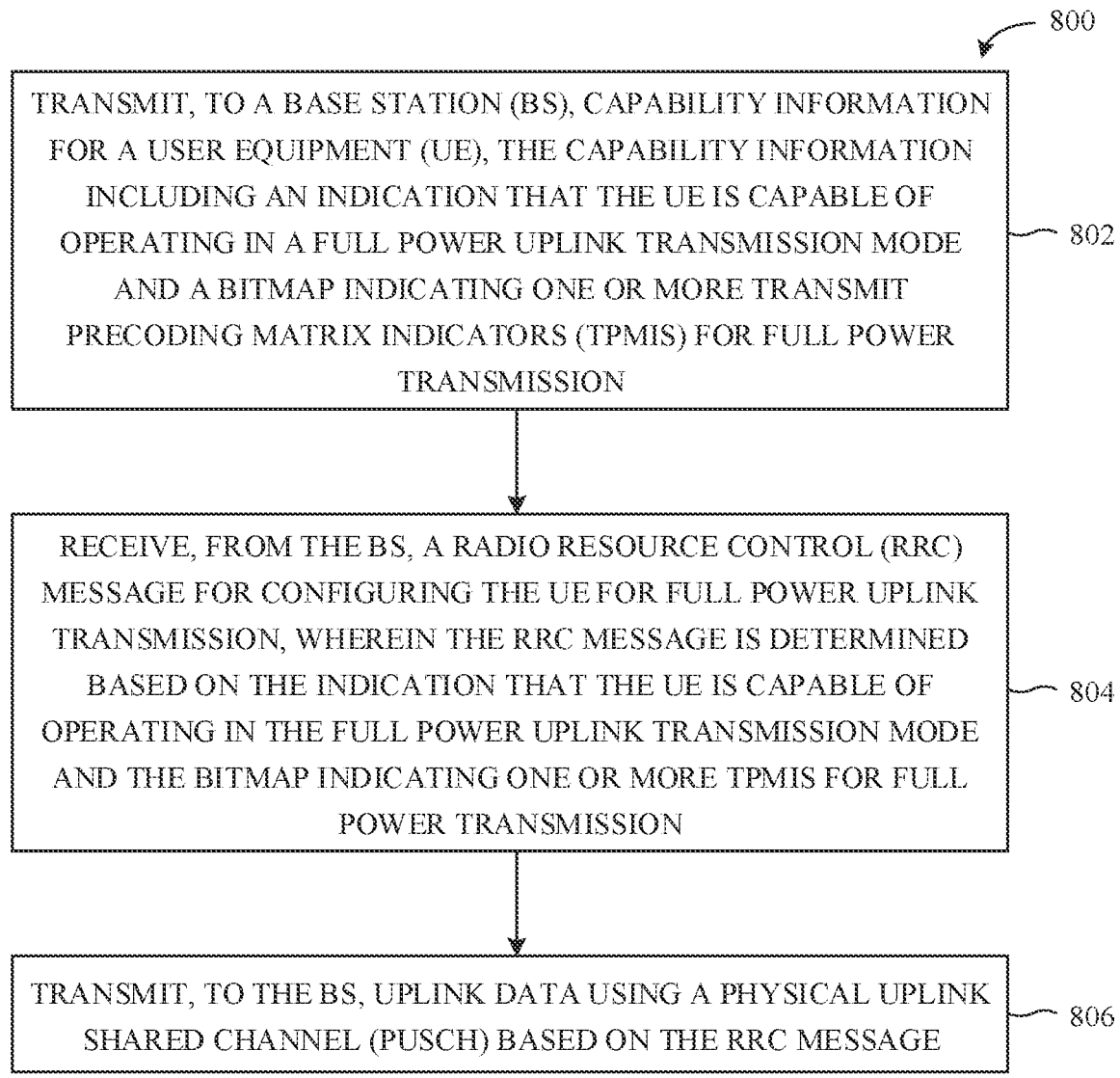

FIG. 8 illustrates a flowchart of an example process 800 for enhancing full power uplink transmission in accordance with some aspects of the present disclosure. In some implementations, the process 800 can be performed by one or more devices or systems described here.

Operations of the process 800 include transmitting, to a base station (BS), capability information for a user equipment (UE) (802). For example, the UE 106 can transmit capability information to the BS 102. The capability information includes an indication that the UE is capable of operating in a full power uplink transmission mode and a bitmap indicating one or more transmit precoding matrix indicators (TPMIs) for full power transmission.

A radio resource control (RRC) message is received from the BS for configuring the UE for full power uplink transmission (804). The RRC message is determined based on the indication that the UE is capable of operating in the full power uplink transmission mode and the bitmap indicating one or more TPMIs for full power transmission. For example, in some implementations, the UE includes two ports, and the bitmap is (1, 1). The RRC message can include, for example, information for allocation of a SRS resource comprising a 1-port SRS to support rank one full power uplink transmission with antenna virtualization by the UE, an indication that no additional SRS resources are needed by the UE, or an indication that UE requires power amplifier (PA) to physical layer (PHY) antenna switching or additional switching delay between TPMI, or both. In some implementations, the UE includes two ports, and the bitmap is (0, 0). The RRC message can include, for example, information for allocation of a SRS resource comprising a 1-port SRS to support rank one full power uplink transmission with antenna virtualization by the UE.

Uplink data is transmitted to the BS on a physical uplink shared channel (PUSCH) based on the RRC message (806). In some implementations, the uplink data is transmitted at full power by the UE based on the RRC message. Although the process 800 is described from the perspective of the UE, in some implementations one or more steps of the process 800 can be carried out from the perspective of the BS as described herein.

Figure 9:
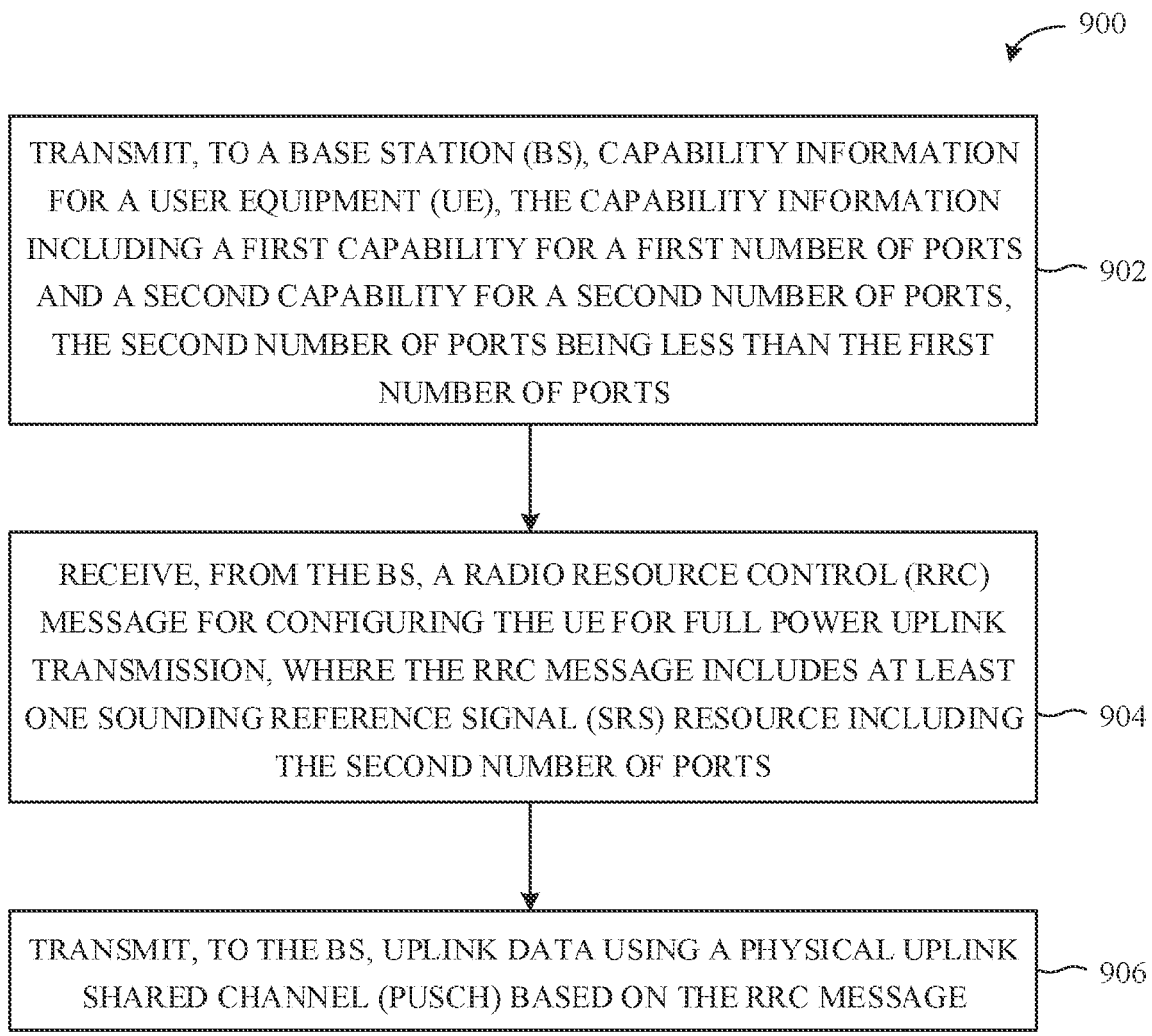

FIG. 9 illustrates a flowchart of an example process 900 for enhancing full power uplink transmission in accordance with some aspects of the present disclosure. In some implementations, the process 900 can be performed by one or more devices or systems described here.

Operations of the process 900 include transmitting, to a base station (BS), capability information for a user equipment (UE) (902). For example, the UE 106 can transmit capability information to the BS 102. The capability information includes a first capability for a first number of ports of the UE and a second capability for a second number of ports of the UE, the second number of ports being less than the first number of ports. In some implementations, the first capability includes an indication of one or more transmit precoding matrix indicators (TPMIs) for full power transmission using the first number of ports, and the second capability includes an indication of one or more TPMIs for full power transmission using the second number of ports. In some implementations, the first or second capabilities, or both, include an indication of a respective TPMI group for the first or second number of ports (or both), which may be a UE-generated group as described herein.

A radio resource control (RRC) message is received from the BS for configuring the UE for full power uplink transmission (904). The RRC message includes at least one sounding reference signal (SRS) resource including the second number of ports. In some implementations, the RRC message configures the UE for full power uplink transmission based on the second capability. In some implementations, the SRS resource is mapped to a TPMI group indicated by the UE. In some implementations, the RRC message includes a second SRS resource with the first number of ports.

Uplink data is transmitted to the BS on a physical uplink shared channel (PUSCH) based on the RRC message (906). The uplink data can be transmitted at full power by the UE based on the RRC message. Although the process 900 is described from the perspective of the UE, in some implementations one or more steps of the process 900 can be carried out from the perspective of the BS as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

What is claimed is:

1. A baseband processor comprising one or more processors configured to perform operations comprising:
   causing transmission of a capability message to a base station (BS), the capability message indicating a full power uplink transmission capability for a user equipment (UE), wherein the UE comprises a first number of ports, and wherein the full power uplink transmission capability indicates support for full power uplink transmission using both the first number of ports and fewer than the first number of ports without explicit additional signaling of a full power capability for fewer than the first number of ports;
   receiving, from the BS, an indication of a sounding reference signal (SRS) resource associated with a second number of ports that is less than the first number of ports; and
   causing transmission of at least one SRS to the BS over the SRS resource using the second number of ports.

2. The baseband processor of claim 1, wherein a rule known by the UE and the BS specifies that the UE supports full power uplink transmission using the first number of ports and fewer than the first number of ports based on the full power uplink transmission capability.

3. The baseband processor of claim 2, wherein the second number of ports comprises one port, and wherein the rule specifies that the UE having the full power uplink transmission capability supports full power uplink transmission of an SRS over one port.

4. The baseband processor of claim 1, wherein the one or more processors are configured to perform operations further comprising:
   receiving, from the BS, an indication of a full power uplink transmission configuration based on the capability message; and
   causing transmission of the at least one SRS to the BS according to the full power uplink transmission configuration.

5. The baseband processor of claim 1, wherein the capability message indicates a full power uplink transmission capability associated with the first number of ports.

6. The baseband processor of claim 1, wherein the capability message includes an indication of one or more transmit precoding matrix indicators (TPMIs), and wherein transmitting the at least one SRS comprises transmitting the SRS using a precoder associated with the one or more TPMIs.

7. The baseband processor of claim 1, wherein the full power uplink transmission capability comprises an implicit indication of support for full power uplink transmission using fewer than the first number of ports.

8. A method to be performed by a user equipment (UE), the method comprising:
   transmitting, to a base station (BS), a capability message indicating a full power uplink transmission capability for the UE, wherein the UE comprises a first number of ports, and wherein the full power uplink transmission capability indicates support for full power uplink transmission using both the first number of ports and fewer than the first number of ports without explicit additional signaling of a full power capability for fewer than the first number of ports;
   receiving, from the BS, an indication of a sounding reference signal (SRS) resource associated with a second number of ports that is less than the first number of ports; and
   transmitting, to the BS, at least one SRS over the SRS resource using the second number of ports.

9. The method of claim 8, wherein a rule known by the UE and the BS specifies that the UE supports full power uplink transmission using fewer than the first number of ports based on the full power uplink transmission capability.

10. The method of claim 9, wherein the second number of ports comprises one port, and wherein the rule specifies that the UE having the full power uplink transmission capability supports full power uplink transmission of an SRS over one port.

11. The method of claim 8, further comprising:
receiving, from the BS, an indication of a full power uplink transmission configuration based on the capability message; and
transmitting, to the BS, the at least one SRS according to the full power uplink transmission configuration.

12. The method of claim 8, wherein the capability message indicates a full power uplink transmission capability associated with the first number of ports.

13. The method of claim 8, wherein the capability message includes an indication of one or more transmit precoding matrix indicators (TPMIs), and wherein transmitting the at least one SRS comprises transmitting the SRS using a precoder associated with the one or more TPMIs.

14. The method of claim 8, wherein the full power uplink transmission capability comprises an implicit indication of support for full power uplink transmission using fewer than the first number of ports.

15. A method to be performed by a base station (BS), the method comprising:
receiving, from a user equipment (UE) having a first number of ports, a capability message indicating a full power uplink transmission capability for the UE, wherein the full power uplink transmission capability indicates support for full power uplink transmission using both the first number of ports and fewer than the first number of ports without explicit additional signaling of a full power capability for fewer than the first number of ports;
transmitting, to the UE, an indication of a sounding reference signal (SRS) resource associated with a second number of ports that is less than the first number of ports; and
receiving, from the UE, at least one SRS transmitted over the SRS resource using the second number of ports.

16. The method of claim 15, further comprising:
determining, based at least in part on the capability message, that the UE supports full power uplink transmission using fewer than the first number of ports.

17. The method of claim 16, wherein the determination is based on a rule known by the UE and the BS, the rule specifying that the UE supports full power uplink transmission using fewer than the first number of ports based on the full power uplink transmission capability.

18. The method of claim 17, wherein the second number of ports comprises one port, and wherein the rule specifies that the UE having the full power uplink transmission capability supports full power uplink transmission of an SRS over one port.

19. The method of claim 15, further comprising:
transmitting, to the UE, an indication of a full power uplink transmission configuration based on the capability message; and
receiving, from the UE, the at least one SRS transmitted according to the full power uplink transmission configuration.

20. The method of claim 15, wherein the capability message indicates a full power uplink transmission capability associated with the first number of ports.

\* \* \* \* \*

UNITED STATES PATENT AND TRADEMARK OFFICE
CERTIFICATE OF CORRECTION

PATENT NO. : 12,452,795 B2  
APPLICATION NO. : 18/375965  
DATED : October 21, 2025  
INVENTOR(S) : Haitong Sun et al.

Page 1 of 1

It is certified that error appears in the above-identified patent and that said Letters Patent is hereby corrected as shown below:

On the Title Page

Column 1, Line 1, Below "(Continued)" insert -- (30) Foreign Application Priority Data
Feb. 12, 2020 (CN) ........ PCT/CN2020/074943 --, as a new field entry.

Signed and Sealed this
Ninth Day of December, 2025

John A. Squires
*Director of the United States Patent and Trademark Office*